Figure 1:
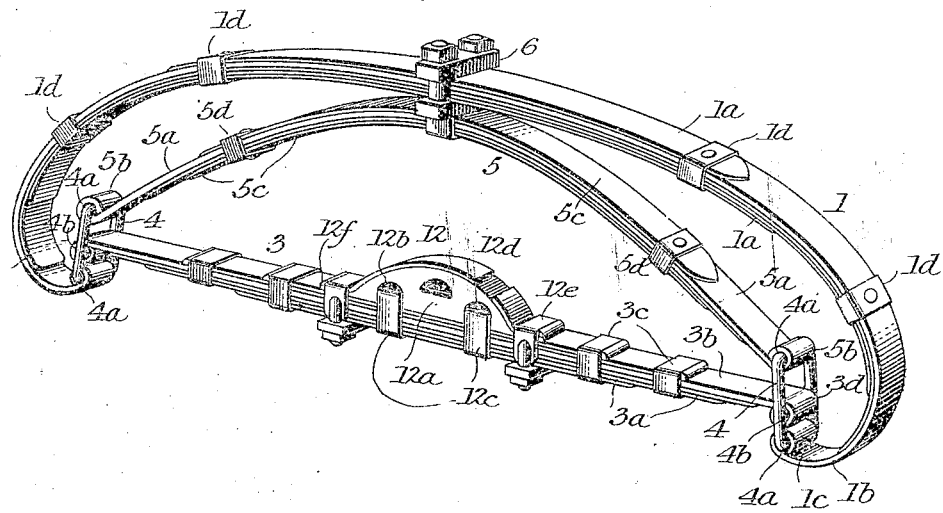

W. E. ANDREW.
SPRING STRUCTURE.
APPLICATION FILED FEB. 21, 1912.

1,060,879.

Patented May 6, 1913.

2 SHEETS—SHEET 1.

WITNESSES

INVENTOR
William E. Andrew,
by Edmund W. Parry
Attorney

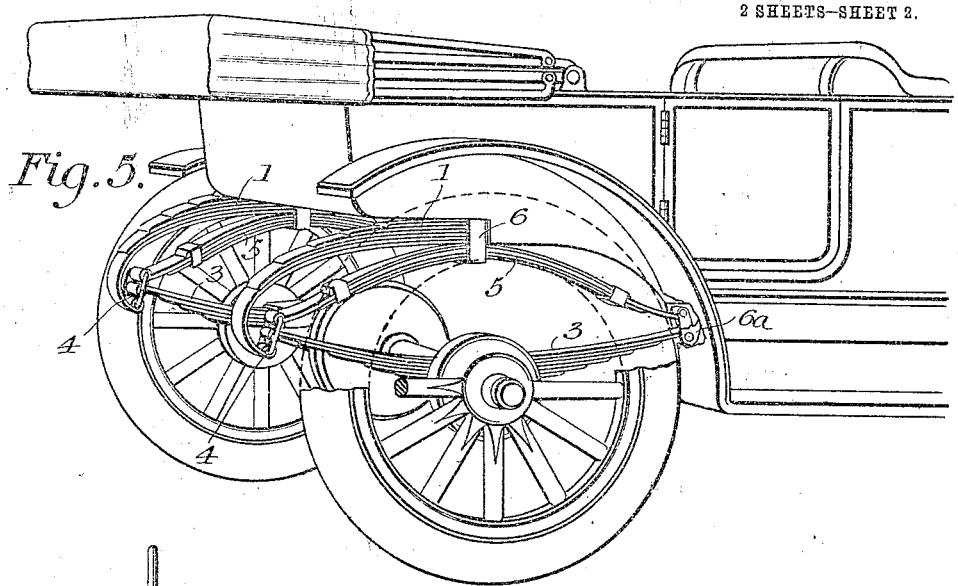
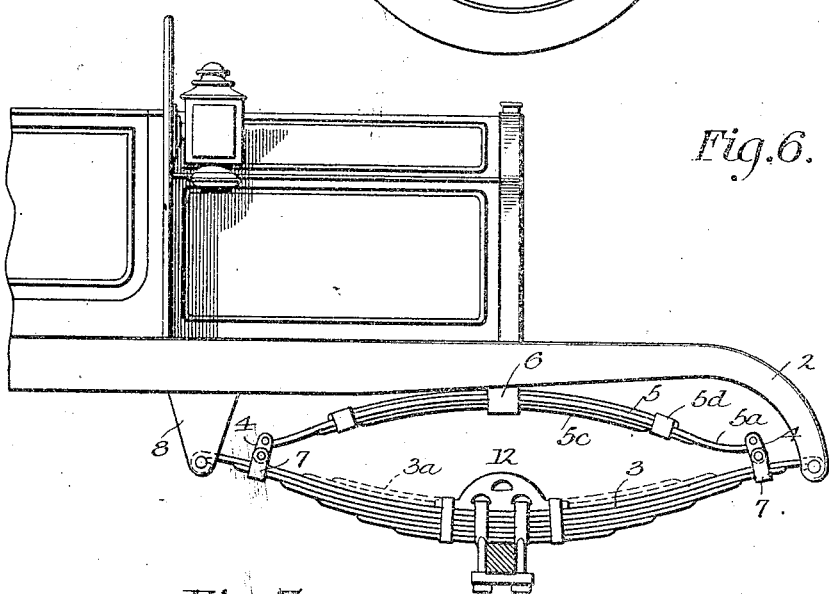
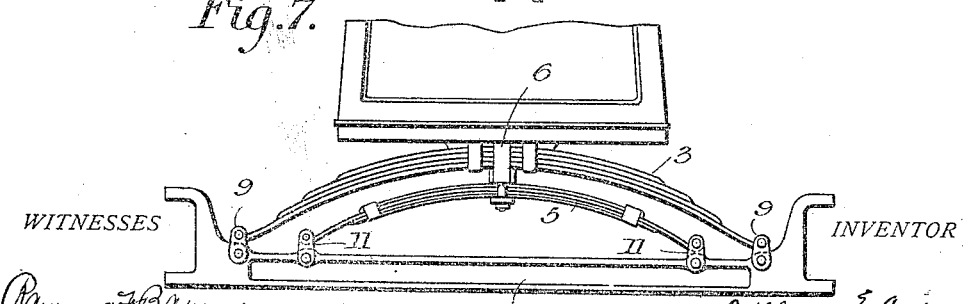

UNITED STATES PATENT OFFICE.

WILLIAM E. ANDREW, OF ATLANTIC HIGHLANDS, NEW JERSEY.

SPRING STRUCTURE.

1,060,879.

Specification of Letters Patent.

Patented May 6, 1913.

Application filed February 21, 1912. Serial No. 679,193.

*To all whom it may concern:*

Be it known that I, WILLIAM E. ANDREW, a citizen of the United States, residing at Atlantic Highlands, in the county of Monmouth and State of New Jersey, have invented certain new and useful Improvements in Spring Structures, of which the following is a specification, reference being had therein to the accompanying drawing.

This invention relates broadly to improvements in spring-structures such as those commonly employed in vehicles and the like.

One object of this invention is to provide an improved spring-structure particularly well adapted for use in vehicles used on roads of more or less uneven surface and which would ordinarily produce sudden jolts and jars.

Another object within the contemplation of this invention is to construct and apply my improved spring-structure to vehicles like automobiles, and whereby the springs interposed between the body and the axles are controlled in such manner that any sudden upward movement of the body (after the springs have been flexed) will be prevented, so that the liability of shocks, jars and the like, are precluded or at least reduced to a minimum.

A further object of the invention is to construct and apply to a vehicle, my improved spring-structure in order that any relative movement between the vehicle-body and the axles may at all times be governed; that is to say, in order that the movement of the body when flexing and, also, after flexing the spring under the stress of the load carried by the body may be absolutely controlled in a positive manner, no matter how great may have been the suddenness or extent of flexure imposed upon the spring.

A still further object of the invention is to provide means for controlling the relative movement between the body and axle of a vehicle and thereby obviate the use of so-called "shock-absorbers," now extensively employed, the action of which is uncertain and the expense of equipping the vehicle therewith is thereby greatly increased.

Still a further object of my invention is to provide a spring-structure which is so constructed that it may be applied to existing structures, that is to the springs of vehicles already equipped with the ordinary type of vehicle-springs and this without the necessity of re-constructing the spring or any of the parts connecting it to the axle and body.

This invention in general seeks to provide a spring structure which is particularly adapted for use in vehicles which are used on roads of more or less uneven surface, and which structure, from an operative standpoint, will in practical use possess a high degree of efficiency and durability and which, structurally considered, will be of the greatest possible simplicity.

Other objects and advantages will be in part obvious from the annexed drawings, and will also be in part pointed out in the following description.

The invention resides broadly in the features of construction, combinations of elements, and arrangements of parts, and in various aggroupments thereof, all as will be exemplified in the construction hereinafter set forth, and the scope of the application of which will be indicated in the claims hereto appended.

In order that this invention may be more clearly made comprehensible to those skilled in its related art, drawings illustrating some of the many possible utilizations of the same are appended hereto as a part of this disclosure, it being manifest that other possible utilizations and embodiments and which employ the underlying principles of my invention, fall within the spirit thereof and within the objects contemplated thereby.

Figure 2:
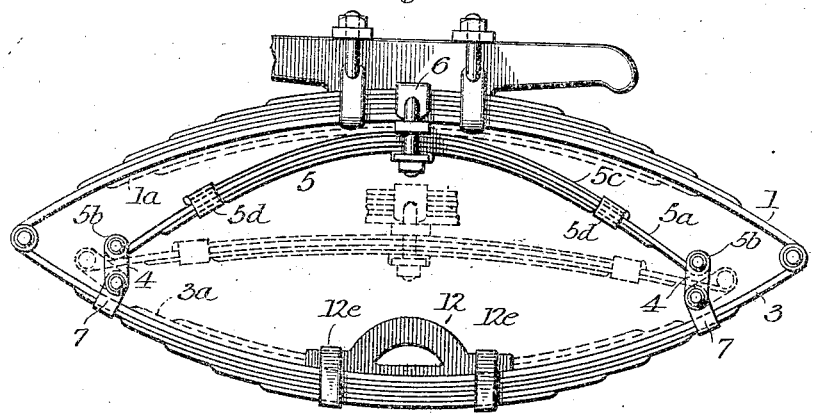
Figure 3:
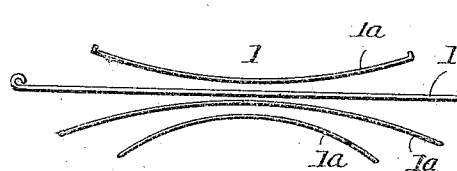
Figure 4:
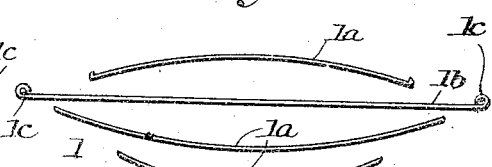

In the accompanying drawings: Figure 1 is a view in perspective of my improved spring structure; Fig. 2 is a view in elevation embodying my invention and as applied to an elliptic spring, parts thereof being shown in dotted lines in the position they assume when the equalizer-device is operated; Fig. 3 is a diagrammatic view showing the elements of the springs which form a part of my spring structure—in this instance, the leaves of the spring being shown separated to make clearer the idea of the "reversed tension"; Fig. 4 is a similar view of another form of construction, showing the spring-elements thereof disposed in an opposite tension-producing position; Fig. 5 is a view in perspective showing the utilization of my improved spring structure as applied to an automobile, and in which form the upper section of the spring is of the so-called three-quarter elliptic; Fig. 6 is a view in elevation, partly in section, of the spring structure modified to permit its utilization in other forms of automobile construction; and Fig. 7 is an elevational view showing my improved spring attached transversely of the axle of a vehicle and as interposed between the axle and spring to which the body of the vehicle is attached.

In the several embodiments of my invention, it is to be understood that there will be a plurality of elements. Essentially, one of these will comprise a spring, preferably of the form hereinafter described in detail; another will be a spring-controlling or equalizing-device preferably connecting with the spring and of the construction hereinafter described in detail and constantly under tension when in operative position; and still another will be a support or sustaining-instrumentality, and this may be either in the form of a spring, or in the form of a bar or arm, or of other appropriate form, according to the manner of utilizing my improved spring structure, or according to its particular application to a vehicle.

Referring to the drawings, and to the embodiments illustrated in Figs. 1, 2, 3, 4, and 5, the numeral 1 designates the sustaining-instrumentality and in this instance is shown, by way of example, as a spring comprising a plurality of leaves 1$^a$, preferably of different lengths but all, by preference, secured to a flat band 1$^b$, which is suitably formed at its ends with loops or eyes 1$^c$, for a purpose presently to be explained. Any preferred form of means for holding the leaves in operative engagement with the band 1$^b$, or with each other—as the case may be—may be utilized; but I have shown such holding means, in this instance, in the form of clips 1$^d$. The upper leaves may have their ends turned upwardly to prevent the clips from working beyond their intended position, as shown. It is a feature of my spring-structure to employ a spring in which the component leaves are formed to have a "reversed tension." By this expression, I mean the aggroupment of a plurality of elements including spring-leaves so related that their tension is normally reversed to one another. For instance, if a pair of spring-leaves are used, they are bowed either away or toward each other, as diagrammatically illustrated in Figs. 3 and 4. In Fig. 3, as will be seen, the band 1$^b$ is normally straight, or approximately so, and the leaves 1$^a$ are bowed toward the band, the outer ends of the leaves having a normal and natural tendency to move away from said band, but which tendency is controlled by the clips 1$^d$. In Fig. 4, the leaves bow away from each other, the outer ends of the leaves having a normal and natural tendency to effect pressure upon said band but in relatively opposite directions, when clipped in proper position to the band. By these forms of construction I find, as a result of experiment and observation, that many advantages are secured and that the spring itself, in its entirety, is of greater strength and less liable to be fractured under the stress of an unusually heavy load or jolt. If desired, a greater number of the spring-leaves may be disposed on one side of the attaching band than on the other (as in Figs. 3 and 4), whereby the action of the set of spring-leaves on the opposite side of the band is checkmated or controlled.

In lieu of the sustaining-instrumentality being in the form of spring, as just described, it may constitute a part of the vehicle and be in the form of an arm 2, such as illustrated in Fig. 6.

Underlying or overlying the sustaining-instrumentality 1—as the case may be, according to the particular application of my improved spring-structure in the vehicle—is a spring-device 3 preferably constructed of a plurality of leaves 3$^a$ operatively held in relation to a band 3$^b$ by clips 3$^c$, said band being formed with bent ends to form loops or eyes 3$^d$—much in the same manner as the spring-sustaining instrumentality 1, already described.

The sustaining spring 1 (or arm 2) on the one part, and the spring-device 3 on the other, may be operatively connected together and in any preferred way. Preferably, and as shown in the drawings, a link 4 may be used. In Fig. 1 this link is illustrated as formed with two end-portions 4$^a$ and with an intermediate portion 4$^b$, the function of which will presently be explained.

Interposed between the sustaining-instrumentality aforementioned and the spring-device 3 is an equalizing or spring-controlling instrumentality 5 which, in the embodiment illustrated in Fig. 1, is secured to the spring-sustaining instrumentality 1 by a clip 6, preferably intermediate of the ends of both the spring 1 and said equalizing-device 5. This spring-device 5 is preferably constructed in much the same manner as I have already described with reference to the springs 1 and 3, and includes a band 5$^a$ formed at its ends with loops 5$^b$ adapted to be pivotally connected to and have a bearing on one of the end-portions 4$^a$ of the link 4. Clipped or otherwise operatively secured to this band are a plurality of reversed-tension leaves 5$^c$. It is to be understood that when the spring device 5 is in operative position, that is, when it is connected, say, to the spring 1, it is of substantially arched form and is constantly under tension, wherefore it is adapted to perform its recoil-controlling function in whatever position the vehicle-body may assume.

It will be understood that, in certain instances, the spring leaves 5ᶜ may be omitted and only the band 5ᵃ be used, dependence being had upon the inherent resiliency of said band to perform its equalizing function with reference to the parts of said structure; or, in lieu of such a construction, the leaves could be omitted from one side of the band and retained on the opposite side, the reversed-tension leaves giving to the band the necessary spring action.

By the interposition of the equalizing-device 5 between the sustaining-instrumentality 1 and the spring-device 3, and by forming said equalizing-device with a reversed tension, and constructing it, as aforementioned, so that it will be constantly tensioned when in operative position, the latter has an inherent tendency to flatten out or assume a straightened condition, and normally tends to cause the instrumentality, to which it is clipped, to have a downward tendency and, at the same time, to control its upward motion. In the construction just described, I provide a spring equalizing-device with a reversed tension, in the sense that the normal tendency of the spring is in the direction of the downward movement of the vehicle-body and reversed to the direction of the upward movement thereof, so that said equalizing-device constitutes a structure the natural tendency of which is to pull the vehicle-body downwardly, but which pulling tendency is normally controlled by the spring device 3.

It will now be seen, by referring particularly to Fig. 1, that the spring 1 is pivotally connected to the lower end-portion 4ᵃ of the link 4 and has its ends bent around and into a plane beneath that of the spring 3. This spring 3 is connected to the intermediate cross-piece 4ᵇ of the link 4; and the equalizer-spring 5 is, as already described, connected to the upper end-portion 4ᵃ of the link. Either the sustaining-instrumentality 1 or the spring 3 may, in any desirable way, be secured to the body or to the axle of the vehicle. In other words, the position of my improved spring-structure may be that illustrated in Fig. 1, in which case the spring 1 would be secured to the body of the vehicle, whereas the spring 3 would be secured to the axle or to a part connecting therewith. On the other hand, the position of the spring structure can be reversed so that the spring 3 would be secured to the vehicle-body and the spring 1 attached to the axle or to a part connecting therewith, and in which latter form the equalizer 5 would be reversed. As will be understood, the load of the vehicle will cause the sustaining-spring 1 to flex, and this in turn flexes the equalizer 5, which then has, as one of its functions, a load-carrying capacity. At the same time, the spring 1 rocks the links 4 on the axes formed by the holding-pieces 4ᵇ and thereby further flexes said equalizer 5. Simultaneously, the weight of the superposed load and parts will flex the spring 3. During the return movement of the parts, the equalizer 5 will control the same, as obvious. It will also be understood that, by connecting the spring-device 5 to the upper end-portion 4ᵃ of the link 4, and the curved ends of the spring member 1 to the lower end-portion 4ᵃ of the link 4, and attaching the spring-device 3 to said link intermediate of the connections to it of the springs 1 and 5, and by reason of the constantly tensioned form of the spring-device 5, the latter will tend to rock said link 4 on the fulcrum 4ᵇ, so that said link then tends to tension the curved ends of the spring 1; wherefore the tensioned condition of the spring-device 5 is augmented by the tension which the tensioned curved ends of the spring 1 impose upon it through the intermediate connecting link 4. This results in an easy and gradual upward movement of the structure supported upon the spring, the spring-device 5 serving to control any sudden recoil thereof.

By reason of the particular construction of the springs constituting any one or more of the instrumentalities herein designated 1, 3 and 5, and the particular manner of connecting them, the action of the spring 3—and even of the spring 1—is absolutely controlled by the equalizer-device 5. For instance, suppose that the load is comparatively great; in the event that a sudden downward movement of the vehicle-body with its load flexes the spring 3, the upward movement of the body will be gradual and be absolutely controlled by the spring-controlling device 5, as will now be obvious, and which result follows from the form of the structure and the manner of connecting the parts thereof, all as just described in detail. By this structure, the spring, when flexed by weight or by sudden jolts, will, during its return to normal position, be controlled in its action by the equalizer 5 which will operate to prevent the body moving upwardly in a rapid manner and, thus, producing a jumping or jolting of the body, with consequent inconvenience or injury to the occupants of the vehicle. It has become the practice to employ various forms of so-called "shock-absorbers" to control the movement and position of the vehicle-body when the same has moved downwardly under the stress of its weight caused by the vehicle-wheels impacting against obstructions or holes or depressions in the road-surface. The return movement of the vehicle-body is, by my spring-structure, equalized so that its return is gradual and steady and without the usual thrusting effect that is caused by the sudden action of an uncontrolled spring in returning to normal position. Usually, in my construction, the upward movement of the vehicle-body, being thus controlled, is practically the same as any downward movement thereof, and this results from the interposition of the equalizer-device 5.

In the embodiment illustrated in Fig. 2, the parts 1 and 3 are suitably jointed at their ends and form an elliptic spring, the leaves of which are so formed as to have a reversed tension—all as hereinbefore fully explained. In this embodiment, the link 4 is mounted on a clip 7 suitably secured to the spring 3 and preferably at a point somewhat removed from the joint between the two springs 1 and 3.

It is to be understood that I can apply to existing forms of springs—elliptic and other types—the feature of reversed tensioned leaves; that is to say, I can supplement the leaves already on such springs by the so-called reversed tension leaves and thereby produce a spring-structure having the advantages which I have already pointed out. Such supplemental leaves would preferably be on the sides of the structure opposite to those already there, as shown in dotted lines in Figs. 2 and 6.

In Fig. 5, my spring-structure is illustrated as applied to the rear portion of an automobile, and in which instance the spring-section of the sustaining-instrumentality 1 is of but half the length illustrated in Fig. 1. It and the equalizer-device 5 are clipped or otherwise secured to the body of the vehicle. At their forward ends, the spring 3 and equalizer-device 5 are connected by the link 4, suitably attached to a bracket 6$^a$ connecting with the vehicle-body. The link at the opposite end connects not only the spring 3 and equalizer-device 5 but, also, the sustaining-instrumentality 1, the same as shown in Fig. 1.

In the modification illustrated in Fig. 6, the sustaining-instrumentality is, as already mentioned, in the form of an arm 2 which is curved downwardly to form a bearing for one end of the spring 3, the opposite end of said spring having a bearing in a bracket 8 depending from the vehicle-body. In this instance, the equalizer-device 5 is clipped to the spring 3 at points removed from their bearing end and is secured to the vehicle-body by the clip 6, as shown.

In the embodiment illustrated in Fig. 7, wherein the spring-structure is arranged transversely of the vehicle-body, the position of the spring 3 is reversed and it is clipped to the body of the vehicle, as shown. At its ends, it is pivotally connected to a bearing 9 mounted on the axle 10. In this instance, the equalizer-device has its ends pivotally mounted in clips 11 secured to the axle 10 and is clipped, intermediate of its ends, to the spring 3.

Under normal action of the spring-structure, its downward movement would be more or less limited, according to the load which it sustains and to the extent of movement which it may be given by any sudden jolting, etc. To limit any tendency of the spring-structure beyond predetermined limits, I elect to interpose, between the spring 3 and the equalizer-device 5, a buffer designated generally by the numeral 12. Preferably, and as shown, this buffer comprises a segment of rubber or other resilient material 12$^a$ provided with a plurality of transverse apertures 12$^b$ to promote resiliency and, through some of which, clips or bands 12$^c$ are inserted to hold the segment firmly upon its support which, in this instance, is shown as the spring 3. A band 12$^d$, of steel or other suitable material, overlies the periphery of the segment and is movably held upon its support by clips 12$^e$. To this end, the end-portions of the band are straight and have their ends turned upward to form limit-stops 12$^f$. It is to be understood that in the event that the load of the vehicle should be sufficient to actuate the spring-structure and cause the clip 6, say, to impinge against the buffer, the band 12$^d$ will serve to protect the rubber segment which, however, will yield under the pressure imposed upon it by said band and, to permit this, the end-portions of the band slide in the clips 12$^e$, as will readily be understood by referring to Fig. 1.

While I have illustrated my invention as applied only to certain forms of springs, it is manifest that the invention may be utilized in connection with any of the various types of springs, not only of the full elliptic form, as illustrated in Fig. 2, but in connection with half and three-fourth elliptics, and have the same function and produce the same results as already explained in connection with the forms of springs specifically described. In other words, my invention is adapted for utilization in connection with various forms of springs. It is also adapted to be applied to existing structures. For instance, as in Figs. 2 and 6, it is simply necessary to introduce the equalizer-spring 5, clip it to the upper member of the elliptic spring, and clip the connecting-link 4 to the lower member of said spring. I prefer, however, to make the members of the elliptic or other forms of springs so that they will have the so-called "reversed tension" feature embodied therein.

From the foregoing, it will be perceived that I have succeeded in devising a spring-structure which is well adapted to achieve the several objects and ends in view. The structure is simple and compact in form, is particularly well suited for road vehicles like automobiles, and the parts of which it is formed are so constructed as to permit of its application to existing forms of spring-structures. It is also to be understood that the language used in the following claims is intended to cover all of the generic and specific features of the invention which, as a matter of language, might be said to fall therebetween.

As many changes can be made in the above construction and many apparently widely different embodiments of this invention can be made without departing from the scope thereof, it is intended that all matter contained in the foregoing description and shown in the accompanying drawings shall be interpreted as illustrative and not in a limiting sense.

What I claim and desire to secure by Letters-Patent is:

1. A spring-structure for vehicles and the like, including in combination, a supporting-member, a spring-member overlying and disposed in movable relation to said supporting-member, and an intermediate resilient spring-controlling instrumentality connected to said spring-member and constantly under tension whereby recoil of the vehicle-body is controlled in any position it may assume and having a normal tendency to effect a downward pulling movement upon said spring-member, said controlling-instrumentality having a movement toward and away from said supporting-member.

2. A spring-structure for vehicles and the like, including in combination, a supporting-member, a spring-member disposed above and longitudinally of said supporting-member and in substantially the same vertical plane therewith, and a resilient spring-controlling instrumentality connecting with said spring-member above said supporting-member and connecting also with said supporting-member and adapted to control the action of said spring-member and constantly under tension whereby it may have a normal tendency to effect a downward pulling movement upon said spring-member whereby recoil of the vehicle-body and upward movement of the same away from said supporting-member may be controlled in any position which said body may assume, said controlling instrumentality having a movement toward and away from said supporting-member in unison with said spring-member.

3. A vehicle-spring including in combination, a sustaining-instrumentality attached to the body of a vehicle, a spring-device extending longitudinally of said sustaining member, and in practically the same vertical plane therewith, and a constantly tensioned spring-controlling member connected to and having a movement toward and away from, said sustaining-instrumentality and operating upon said spring-device for controlling its movement in one direction and whereby recoil of the vehicle-body is controlled in any position it may assume.

4. A vehicle-spring comprising a sustaining-instrumentality, a spring-device connecting therewith and comprising a plurality of elements, one at least of which is normally under tension, and a resilient spring-controlling device interposed between the aforementioned parts, at all times when in operative position under tension, and adapted to control the action of said spring-device and comprising a plurality of parts, one at least of which is normally under tension.

5. A vehicle-spring comprising two spring-devices connected at one end, and an interposed spring-controlling instrumentality comprising a plurality of parts, one at least of which is formed to have a reversed tension with respect to the part which it engages and adapted to produce in said controlling instrumentality a constantly tensioned condition, whereby its normal tendency is to effect a pulling action upon at least one of said two spring-devices.

6. As an article of manufacture, a spring-structure including a plurality of spring-instrumentalities each comprising a plurality of elements formed with a reversed tension with respect to certain of the elements composing said spring-instrumentalities, and a spring-controlling device interposed between said spring-instrumentalities and connected with each other and comprising a plurality of elements, some of which are formed with a normally reversed tension to produce in said spring-controlling device a constant tendency to effect a pulling action upon the uppermost of said spring-instrumentalities.

7. A spring-structure comprising a sustaining-member, a spring-device overlying said sustaining-member and movably connecting therewith, a connection disposed between said sustaining-member and said spring-device whereby they are permitted to have relative movement, and a spring-controlling device attached to said spring-member and adapted to have a normal downward pulling action on said spring-device, said controlling-device being attached to said connection at a point removed from the points of connection between said sustaining-member and said spring-device and having a to-and-fro movement in relation to said sustaining-member.

8. A spring-structure including in combination, a pair of springs extending longitudinally of and in the same vertical plane with each other, a link-connection operatively related to said springs and adapted to permit movement of one in relation to the other, and a spring-controlling device attached to the uppermost spring intermediate of its ends and adapted to have a downward pulling action thereon, said device being connected at one of its ends with said link-connection and being, when in operative position, at all times under tension.

9. A spring-structure including in combination, a pair of springs extending longitudinally of each other and one overlying the other, a spring-controlling device interposed between said springs and connecting with the uppermost spring and, being at all times under tension, adapted to effect a downward pulling action on said upper spring, and a rocking connection fulcruming on the lower spring and to which connection the spring-controlling device is attached above the fulcrum of said connection.

10. A spring-structure including in combination, a plurality of springs extending longitudinally of each other and one of which overlies another, a spring-controlling device at all times under tension interposed between said springs and connected to the uppermost of said springs and having a normal tendency to effect a downward pulling action on said uppermost spring, a rocking link-connection fulcruming on one of said springs and to which said spring-controlling device is attached above its fulcrum and connecting with the other of said springs and adapted, by its rocking action, to tension said springs.

11. A spring-structure including in combination, a plurality of springs extending longitudinally of each other and one overlying another, a spring-controlling device attached to the uppermost of said springs and at all times under tension and having a normal tendency to effect a downward pulling action on said uppermost spring, and a rocking connecting-member fulcruming on another of said springs and to which said spring-controlling device is attached above the fulcrum of said rocking-member and adapted by its rocking movement to effect a tension on one or another of said springs.

12. A spring-structure comprising a pair of elements operatively connected at one end, one of said elements comprising a plurality of leaves, one of which is formed with a reversed tension, a link interposed between said elements, an element-controlling device connecting with one of said elements and pivotally connected at one end to said link and comprising a plurality of leaves, one of which is formed with a reversed tension, and a buffer member interposed between one of said elements and said element-controlling device and consisting of a resilient instrumentality, a band embracing the same, and means for holding said band and resilient instrumentality in intimate contact.

13. A spring-structure including in combination, a plurality of components, one comprising a spring composed of an attaching band and a leaf movably mounted thereon and possessing a reversed tension; another component comprising a sustaining-instrumentality, and an equalizer-component interposed between the other components and including an attaching band and a reversed tension spring-leaf and constantly under tension, and a link-device operatively connecting a plurality of said components.

14. A spring-structure including in combination, a plurality of components operatively connected; one component including a sustaining-instrumentality; a second component including a normally arched spring composed of an attaching band and a reversed tension leaf, said arched component being at all times under tension and adapted to effect a pulling action, and means for operatively connecting the components whereby action of said spring-component is controlled and equalized by said equalizer-component.

15. A spring-structure including in combination, a plurality of components operatively connected; one component including a sustaining-instrumentality; a second component including a normally arched spring composed of an attaching band and a reversed tension leaf, said arched component being constantly under tension, means for operatively connecting the components whereby action of said spring-component is controlled and equalized by said equalizer-component, and a buffer interposed between one of said components and said equalizer-device.

16. A spring-structure including in combination, a plurality of normally arched springs connected to each other, one of said arched springs being constantly under tension and adapted to effect a pulling action upon the spring to which it is connected, a third spring underlying said arched springs, a rocking link attached adjacent the ends of said arched springs and fulcruming on said third spring and, by its movement, adapted to tension one or another of said three springs, and a buffer interposed between the arched springs and said third spring and adapted to be engaged by one of said arched springs.

17. A spring-structure including in combination, a plurality of normally arched springs connected to each other, one of said arched springs being constantly under tension and adapted to effect a pulling action upon the spring to which it is connected, a third spring underlying said arched springs, a rocking link attached adjacent the ends of said arched springs and fulcruming on said third spring and, by its movement, adapted to tension one or another of said three springs, and a buffer interposed between the arched springs and said third spring and adapted to be engaged by one of said arched springs, said buffer being provided with an opening formed with a flat wall and an overlying arched wall.

18. A spring-structure including in combination, an upper and a lower spring, a rocking member forming a connection between said springs and fulcruming on the lower spring, a spring-controlling device connected at its end to said rocking member, and a connection between said spring-controlling device and said upper spring whereby said device effects a downward strain upon said upper spring.

19. A spring-structure including in combination, a swiveling connection-device, an upper spring connected to said device at its lower portion, a second spring connected to said device adjacent its central portion, and an equalizer-device connected to said swiveling-device at its upper portion, said swiveling-device under the strain imposed on it by said upper spring operating to effect a tensioning of said equalizer-device and a downward strain upon said upper spring.

20. A spring-structure including in combination, a swiveling connection-device, an upper spring connected to said device at its lower portion, a second spring connected to said device adjacent its central portion, an equalizer-device connected to said swiveling-device at its upper portion, said swiveling-device under the strain imposed on it by said upper spring operating to effect a tensioning of said equalizer-device and a downward strain upon said upper spring, and a yielding bumper disposed in the path of movement of said equalizer-device and provided with a plurality of arched orifices.

21. A spring-structure including in combination, an upper and lower spring, rocking members forming a connection between said springs and fulcruming on the lower spring, a spring-controlling device connected at its end to said rocking members, and a connection between said spring-controlling device and said upper spring whereby said device effects a downward strain upon said upper spring.

22. A spring-structure including in combination, a spring-member, a supporting-member, an equalizing-device, and a connecting-device provided with three bearing portions, to the uppermost of which said equalizing-device is attached, said spring-member being attached to the lowermost of said bearing portions, and said supporting-member being attached to the intermediate bearing portion, whereby movement of said spring-member effects a rocking movement of said connecting-device that is imparted to said equalizing-device and vice versa.

In testimony whereof I affix my signature in presence of two witnesses.

WILLIAM E. ANDREW.

Witnesses:
A. M. PARKINS,
EDMUND H. PARRY.